United States Patent

[11] 3,604,530

[72] Inventors Louis Duthion
Paris;
Pierre Bonnet, Paris; Paul A. L. Coudray, Villepreux, all of, France
[21] Appl. No. 831,923
[22] Filed June 10, 1969
[45] Patented Sept. 14, 1971
[73] Assignee Bertin & Cie
Plaisir, Yvelines, France
[32] Priority June 12, 1968
[33] France
[31] 154,702

[54] SILENCER DEVICE FOR JET AIRCRAFTS
9 Claims, 5 Drawing Figs.

[52] U.S. Cl. .................................................... 181/33 HE,
181/33 K, 181/50
[51] Int. Cl. ........................................................E04h, F01n
1/00, B64f 1/26
[50] Field of Search............................................ 181/33,
33.1, 33.22, 33.223 HE, 33.4 K, 42, 50

[56] References Cited
UNITED STATES PATENTS

| 2,685,936 | 8/1954 | Brenneman et al. | 181/33 (.22) |
| 3,096,847 | 7/1963 | Hardy | 181/33 (.223) |
| 3,349,868 | 10/1967 | Kurtze | 181/33 (.22) |

FOREIGN PATENTS

| 1,273,167 | 7/1968 | Germany | 181/33 (.22) |
| 638,407 | 6/1950 | Great Britain | 181/33 (.22) |
| 774,550 | 5/1957 | Great Britain | 181/33 (.22) |
| 442,705 | 1/1968 | Switzerland | 181/33 (.22) |

Primary Examiner—Robert S. Ward, Jr.
Attorney—Watson, Cole, Grindle & Watson

ABSTRACT: A fixed silencing system for jet aircraft in particular, comprising essentially a chamber or enclosure formed by a structure so cut away at the front part as to accommodate that portion of the aircraft which bears the or each jet engine requiring to be silenced, the rear end of the structure being closed by at least one soundproofing partition, and one or more movable soundproofing panels being provided to close the front part in front of the or each jet engine.

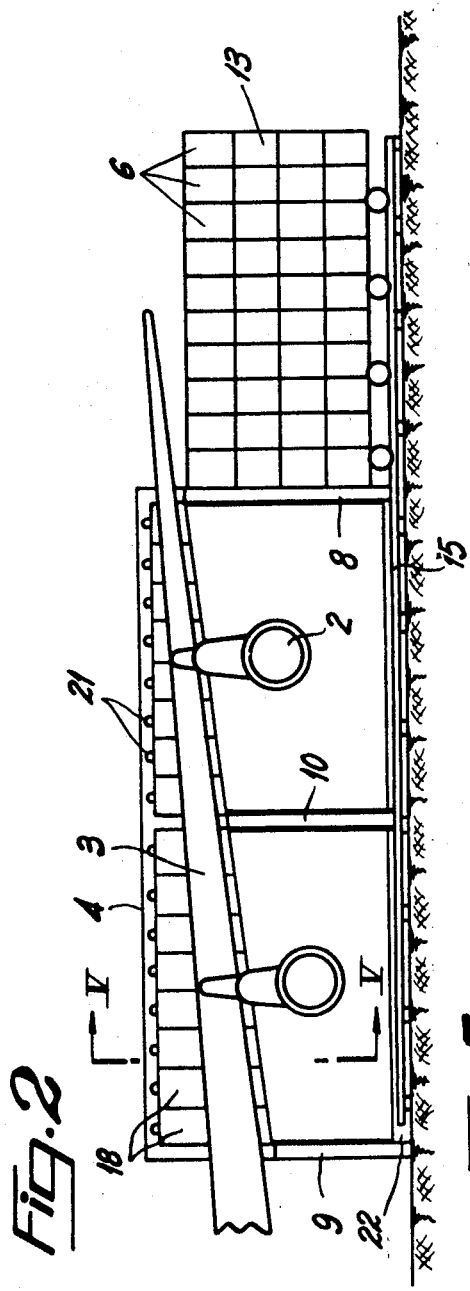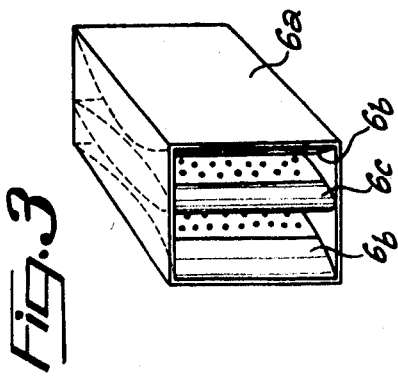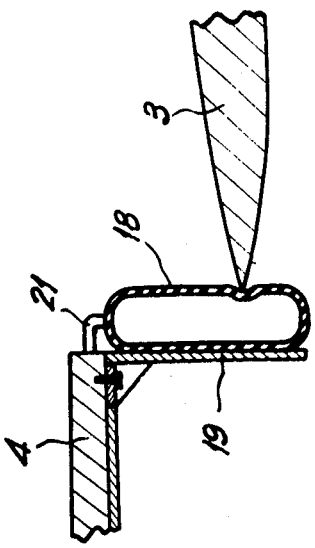

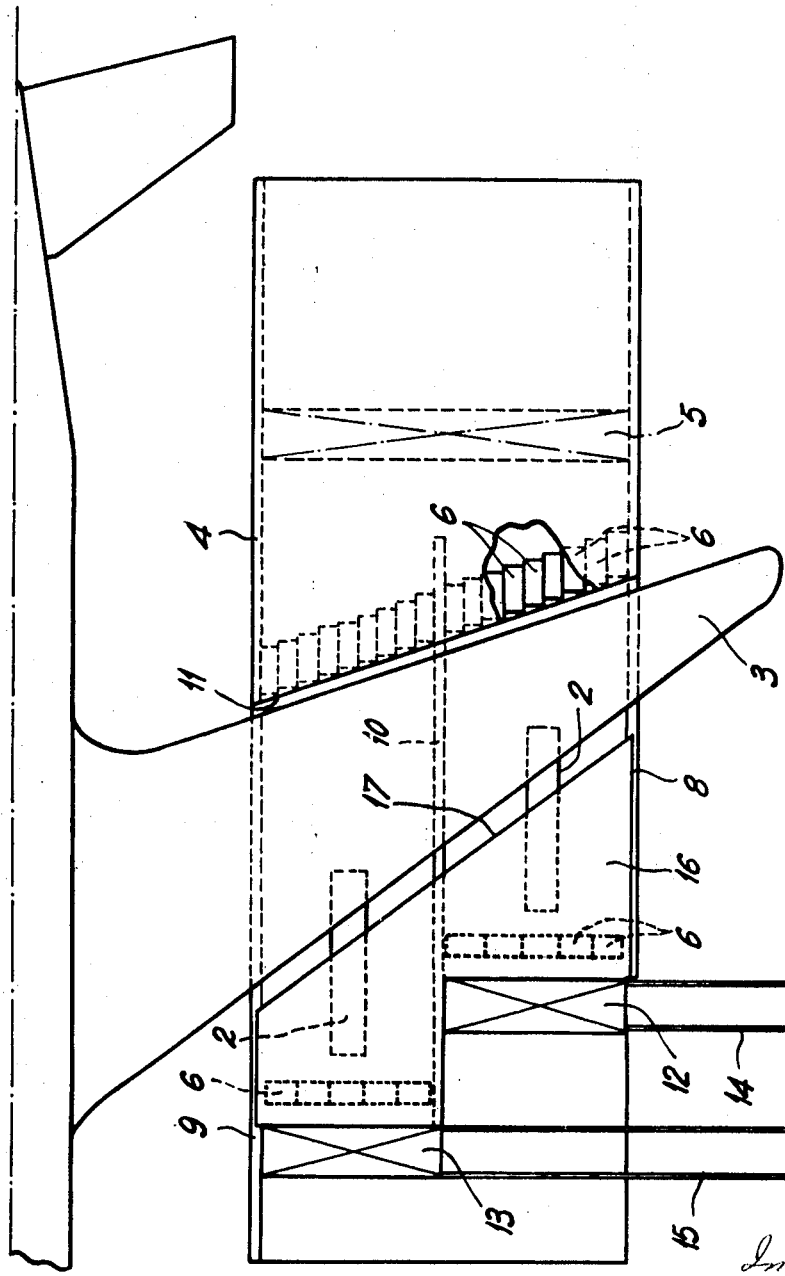

SILENCER DEVICE FOR JET AIRCRAFTS

This invention relates to a fixed silencing system for aircraft, such system being very different from the conventionally used types which generally consist of a metal tube of absorbent properties which is situated behind the jet engine jet pipe.

The silencing system according to the invention comprises essentially a closed chamber, preferably of concrete, which surrounds the or each jet engine whose noise is to be attenuated, the ends being so arranged as simultaneously to soundproof the intake and the exhaust of the or each jet engine.

A silencing system of this type has numerous advantages over conventional systems, namely: it is much cheaper —30 to 40 per cent cheaper according to the required attenuation. It requires very little maintenance, if any. It is extremely simple to use. It is independent of the wind direction and the velocity in the case of the jet engine air intakes. The attenuation provided in every position is better than that provided by conventional silencers.

The invention will be more readily understood from the following description with reference to the accompanying drawings which are given solely by way of example without limiting force and the features disclosed in the drawings and the text naturally form part of the invention.

FIG. 2 is a front view of the same silencing system.

FIG. 3 is a perspective view of a cellular soundproofing element.

FIG. 4 is a plan view of a silencing system provided with additional soundproofing accessories.

FIG. 5 is a section on the line V —V in FIG. 2.

Figure 1:
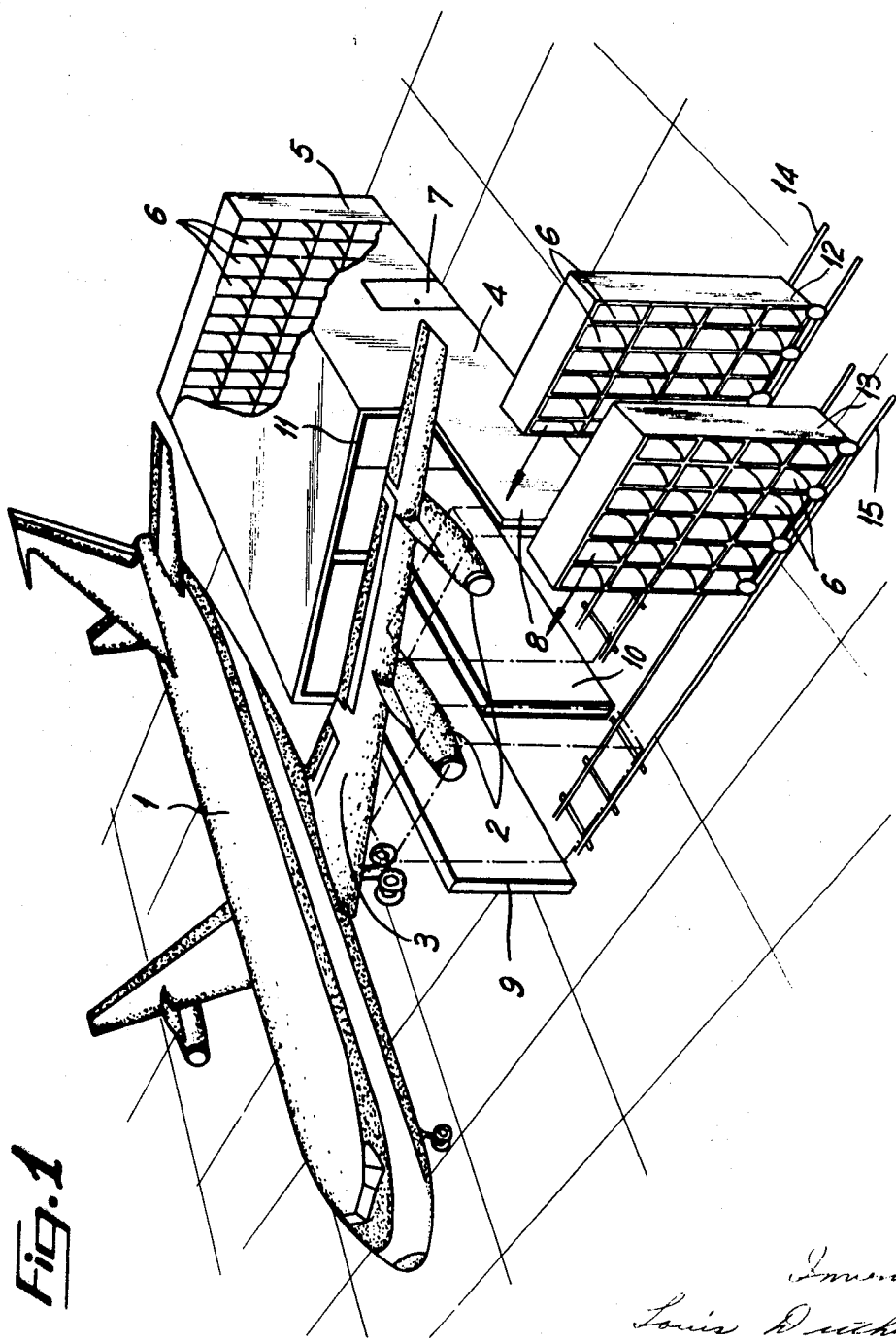
FIG. 1 is a diagrammatic perspective view of a silencing system according to the invention adapted for an aircraft having two jet engines secured to the wings.

In the exemplified embodiment shown in the drawings, the silencing system is intended for aircraft 1 having two jet engines 2 or groups of jet engines secured to the wings 3, each of which is associated with an enclosure or chamber. Only one of the latter is shown in the drawings. Each enclosure or chamber comprises a substantially parallelepipedal and covered structure 4, for example of concrete, having a sound-absorbing covering. The base of the structure, which may consist of the surface supporting the aircraft, may be covered with a sound-absorbent covering 22 in order to reduce the noise level inside the enclosure and hence the external noise. The end of the structure consists of a sound-proofing partition 5 formed by modular parallelepipedal elements 6. To improve the noise attenuation, the partition 5 may be provided with another partition which would be disposed parallel thereto to form an expansion chamber as shown in FIG. 4.

The elements 6 may be of the type described in applicants' French Pat. No. 133,529 of Dec. 22, 1967 and, as shown in FIG. 3, comprise a thin casing 6a which is open along two of its opposite surfaces, two other surfaces being provided with a lining 6b formed with small apertures and bounding a convergent-divergent passage in the element. This passage may be divided into a plurality of passages by means of one or more cores 6c of a structure similar to that of the linings 6b. The spaces between the linings 6b and the walls of the casing and the inside of the core 6c are filled with soundproofing material e.g. glass wool.

The structure 4 has one or more side doors 7.

Its front part, i.e. the part farthest away from the partition 5 has cutaway portions, as shown in FIGS. 1 and 2, so that the aircraft 1 can house part of its wing with the jet engines 2 therein.

To this end, the side walls 8 and 9 of the structure 4 are interrupted at a level slightly below that of the corresponding portion of the wing 3.

Preferably, at least the front portion of the structure 4 has a substantially central longitudinal portion 10 which is also cut away like the walls 8 and 9 to allow the wing 3 to pass therein. This partition is intended to be situated between the jet engines 2. It contributes towards bearing the roof of the structure 4.

To allow for the camber of the wing 3, the cutaway portions of the walls 8 and 9 and of the partition 10 are offset so that the roof of the enclosure is bounded by an oblique ridge 11 parallel and adjacent to the trailing edge of the wing when the aircraft is correctly situated.

The walls 8 and 9 and the central partition 10 are offset in the direction of the length of the structure 4 so that their front edges are situated substantially in a plane parallel to the vertical plane of the leading edge of the wing 3.

This offsetting of the walls and partition is utilized to close the compartments bounded by the partition in the structure 4 near and substantially equidistant from the jet engine intakes.

Closure is by means of panels 12 and 13 comprising soundproofing elements 6 and running respectively on rails 14 and 15 substantially perpendicular to the walls and partitions.

The dimensions of the panels and the position of the rails are such that at the end of its travel the panel 12 is adjacent the exposed portion of the partition 10 and the front edge of the wall 8 while the panel 13 bears against the exposed portion of the wall 9 and the front edge of the partition 10.

The soundproofing elements 6 making up the panels 12 and 13 through which the fresh air required for the engines is drawn in may comprise a film of synthetic plastic material interposed between the insulating material and the small apertured walls of the linings 6b and of the core 6c in order to prevent particles of insulating material from being drawn in by the aircraft engines.

To improve the noise attenuation, the cutaway portion of the structure for the passage of the wing may be closed to varying amounts for which purpose, for example, as shown in FIG. 4, the two panels may be connected by a screen 16 whose rear edge is arranged obliquely so that when the aircraft is in position in the silencing system said edge is substantially parallel with the leading edge of the wing.

The screen 16 is soundproofed. Behind the panels 12 and 13 it may also comprise rows of soundproofing elements 6 which descend almost below the jet engine intakes to promote the entry of fresh air.

Other rows of elements 6 may be provided beneath the roof along the edge 11 thereof in the space between the latter and the trailing edge of the wing.

Furthermore, the openings between the wings 3 and the enclosures 4 may be closed by deformable elements which may advantageously consist of inflatable enclosures 18 as shown in FIG. 5. These enclosures are secured to supports 19 fixed near the free edges of the enclosure walls such as the edge 11 of the roof of the structure 4. These enclosures are inflated by means such as conduits 21 connected to a pressure fluid source (not shown).

Of course modifications may be made to the above-described embodiments, more particularly by the use of equivalent technical means, without thereby departing from the scope of the invention.

What is claimed is:

1. A fixed silencing system for an aircraft provided with engine-bearing wings, comprising an enclosure formed by a structure having longitudinal walls and a roof supported by said walls, and closed at its rear end by a soundproofing partition, the upper front part of said walls and the front part of said roof being cut away to accommodate an engine-bearing part of a wing of said aircraft so that the trailing edge of said wing is substantially parallel to the cutaway portion of said roof and at least one soundproofing panel movable transversely with respect to said longitudinal walls to close the front part of said walls in front of said engine-bearing part of said wing.

2. A silencing system as claimed in claim 1 wherein said longitudinal walls terminate in a vertical plane substantially parallel to the leading edge of said wing part, when said part is accommodated within said structure.

3. A silencing system as claimed in claim 2, wherein said wing part carries a plurality of engines and said longitudinal walls are adapted to constitute longitudinal compartments, one for each engine, said movable panels being so offset to be substantially equidistant from the front end of said engine when said wing part is accommodated within said structure.

4. A silencing system as claimed in claim 1 wherein said soundproofing panel is provided with a screen the rear edge of which is adapted to be situated close to the leading edge of said engine-bearing part of said wing when said part is accommodated within said structure and when said panel is in a closure position.

5. A silencing system as claimed in claim 4 wherein soundproofing elements are provided under said screen adjacent said panel.

6. A silencing system according to claim 1 wherein said rear partition and said soundproofing panel comprise modular parallelepipedal soundproofing elements containing convergent-divergent passages.

7. The silencing system set forth in claim 6, wherein said soundproofing elements comprise inner linings filled with a soundproofing material and bounding said convergent-divergent passages.

8. The silencing system set forth in claim 7, wherein said soundproofing elements for situation in front of said engine-bearing part of the wing comprises a synthetic plastic film interposed between said inner linings and said soundproofing material.

9. The silencing system set forth in claim 1, including inflatable enclosures for closing openings between the wing and said structure.